US008390652B2

(12) United States Patent
Nakanishi et al.

(10) Patent No.: US 8,390,652 B2

(45) Date of Patent: Mar. 5, 2013

(54) DRIVE CONTROL CIRCUIT AND DRIVE CONTROL METHOD FOR COLOR DISPLAY DEVICE

(75) Inventors: Kazuhiro Nakanishi, Osaka (JP); Motomitsu Itoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 611 days.

(21) Appl. No.: 12/450,840

(22) PCT Filed: Feb. 22, 2008

(86) PCT No.: PCT/JP2008/053088

§ 371 (c)(1), (2), (4) Date: Oct. 15, 2009

(87) PCT Pub. No.: WO2009/001579

PCT Pub. Date: Dec. 31, 2008

(65) Prior Publication Data

US 2010/0103201 A1 Apr. 29, 2010

(30) Foreign Application Priority Data

Jun. 25, 2007 (JP) ................................ 2007-165874

(51) Int. Cl.

*G09G 5/10* (2006.01)
*G09G 5/00* (2006.01)
*G06F 3/038* (2006.01)

(52) U.S. Cl. ....................................... 345/690; 345/204

(58) Field of Classification Search ........................ None
See application file for complete search history.

(56) References Cited

U.S. PATENT DOCUMENTS 6,954,191 B1 10/2005 Hirano et al.

(Continued)

FOREIGN PATENT DOCUMENTS

CN 1797073 7/2006

(Continued)

*Primary Examiner* — Amare Mengistu
*Assistant Examiner* — Antonio Xavier
(74) *Attorney, Agent, or Firm* — Harness, Dickey & Pierce

(57) ABSTRACT

One object of an embodiment of the present invention is to provide a drive control circuit for a display device which is capable of displaying high-quality color images suited for external environment, display contents or the like by fully utilizing high representational capability of a display panel of multi-primary color configuration. A liquid-crystal color-display device includes a conversion circuit for adjusting a level of primary-color signals which represent the color images to be displayed. The conversion circuit receives four primary-color signals R1, G1, B1, W1 corresponding to four primary colors of red, green, blue and white as data signal for the color image display; then adjusts the level of these primary-color signals R1, G1, B1, W1 based on an externally inputted primary-color control signal; and outputs primary-color signals R2, G2, B2, W2 which are signals obtained by the adjustment. In the primary-color signal level adjustment process for the four primary colors based on the primary-color control signal, the adjustment is performed in such a way that a relationship between the inputted primary-color signal and the adjusted primary-color signal for a white color among the four primary colors is different from a relationship between the inputted primary-color signal and the adjusted primary-color signal for each of red, green and blue colors.

5 Claims, 7 Drawing Sheets

U.S. PATENT DOCUMENTS

| | | | | |
|---|---|---|---|---|
| 2004/0046725 | A1* | 3/2004 | Lee | 345/88 |
| 2005/0140614 | A1* | 6/2005 | Baek | 345/87 |
| 2005/0184998 | A1 | 8/2005 | Yang et al. | |
| 2006/0139527 | A1 | 6/2006 | Chang et al. | |
| 2006/0256053 | A1 | 11/2006 | Baek | |
| 2006/0268003 | A1* | 11/2006 | Tanase et al. | 345/603 |
| 2007/0024557 | A1* | 2/2007 | Rho et al. | 345/88 |
| 2007/0064162 | A1* | 3/2007 | Yamamoto et al. | 348/790 |
| 2007/0257944 | A1* | 11/2007 | Miller et al. | 345/694 |
| 2008/0278466 | A1* | 11/2008 | Joo | 345/205 |

FOREIGN PATENT DOCUMENTS

| | | |
|---|---|---|
| JP | 2001-154636 | 6/2001 |
| JP | 2002-149116 | 5/2002 |
| JP | 2004-102292 | 4/2004 |
| JP | 2005-242300 | 9/2005 |
| JP | 2006-163068 | 6/2006 |
| JP | 2006-317899 | 11/2006 |
| JP | 2008-26339 | 2/2008 |
| WO | WO 2006/068224 | 6/2006 |

* cited by examiner

Fig.6
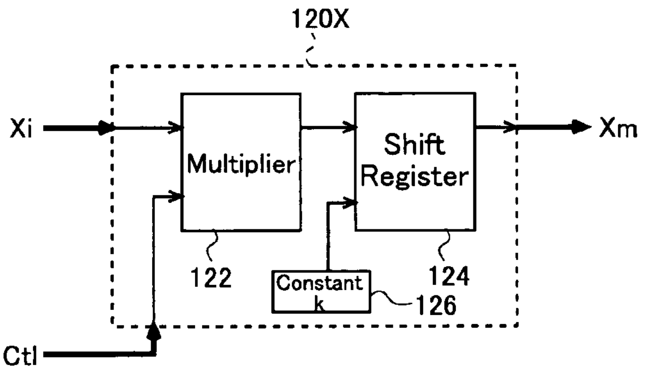
Fig.7
| Xm | 0 | 1 | 2 | 3 | • • • • • | 255 |
|---|---|---|---|---|---|---|
| Xo | 0 | 2 | 4 | 6 | • • • • • | 510 |
Fig.8
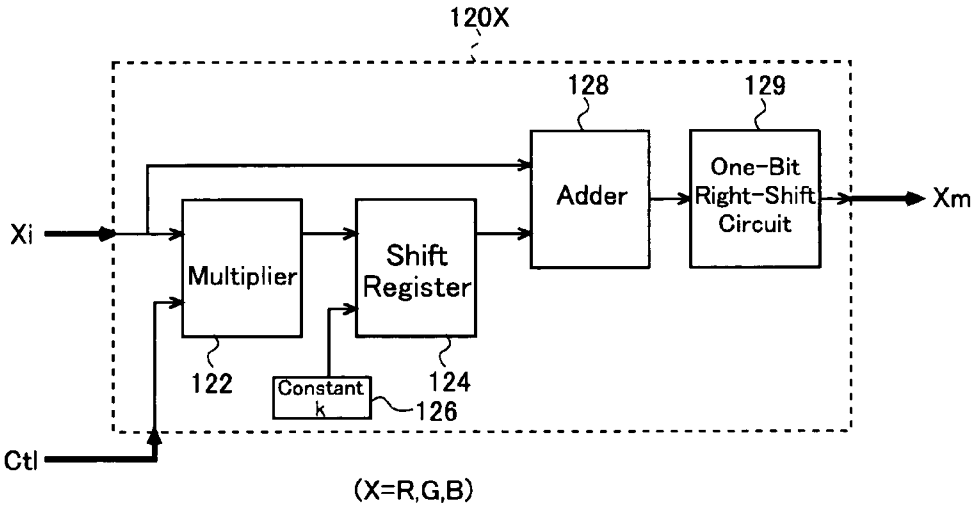
(X=R,G,B)

DRIVE CONTROL CIRCUIT AND DRIVE CONTROL METHOD FOR COLOR DISPLAY DEVICE

TECHNICAL FIELD

The present invention relates to color display devices, and more specifically to drive control of color display devices which display color images based on four or a greater number of primary colors including three primary colors of red, green and blue.

BACKGROUND ART

Display devices typically display color images by means of additive color mixing of three primary colors consisting of red (R), green (G) and blue (B). In other words, in color image display, each pixel in the color display device is constituted by an R sub-pixel, a G sub-pixel and a B sub-pixel representing red, green and blue respectively. Therefore, in liquid-crystal color-display panels for example, each pixel formation portion for forming a pixel is constituted by an R sub-pixel formation portion, a G sub-pixel formation portion and a B sub-pixel formation portion which control optical transmission of red, green and blue lights respectively. The R sub-pixel formation portion, the G sub-pixel formation portion and the B sub-pixel formation portion are typically implemented by color filters.

Meanwhile, there is another color configuration proposed for displaying images in color, where each pixel consists of an R sub-pixel, a G sub-pixel, a B sub-pixel and a W sub-pixel which correspond to red (R), green (G), blue (B) and white (W), respectively. In this case, a backlight is disposed behind the liquid crystal panel to provide white light, and the W sub-pixel formation portion is either not provided with a color filter or provided with an achromatic or substantially achromatic color filter. This arrangement allows to improve brightness or to reduce power consumption in the liquid-crystal color-display device. There are still other color configurations for displaying images in color where each pixel includes sub-pixels for four or more primary colors including the three primary colors of red, green and blue plus additional primary colors other than white.

The following is a list of known examples of such color configurations as described above (hereinafter called "multi-primary-color configuration") where each pixel includes four or more sub-pixels corresponding to four or more primary colors. (In the following list, each color combination example is followed by a corresponding sub-pixel combination which constitutes a pixel.)

a) Four primary colors consisting of red, green, blue and white: R sub-pixel, G sub-pixel, B sub-pixel and W sub-pixel
b) Five primary colors consisting of red, green, blue, cyan and yellow: R sub-pixel, G sub-pixel, B sub-pixel, C sub-pixel and Y sub-pixel
c) Six primary colors consisting of red, green, blue, cyan, magenta and yellow: R sub-pixel, G sub-pixel, B sub-pixel, C sub-pixel, M sub-pixel and Y sub-pixel
d) Seven primary colors consisting of red, green, blue, cyan, magenta, yellow and white: R sub-pixel, G sub-pixel, B sub-pixel, C sub-pixel, M sub-pixel, Y sub-pixel and W sub-pixel Typically, in liquid-crystal color-display devices, display data which is externally supplied is of an RGB three-primary-color format even in cases where the display devices use a liquid crystal panel of a multi-primary-color configuration.

Thus, if the liquid crystal panel is, for example, of a four-primary-color configuration where each pixel includes an R sub-pixel, a G sub-pixel, a B sub-pixel and W sub-pixel, the liquid crystal display device is provided with a conversion circuit for conversion of primary-color signals R1, G1, B1 corresponding to the three primary colors of RGB (hereinafter called "three-primary-color signals") into primary-color signals R2, G2, B2, W2 corresponding to the four primary colors of RGBW (hereinafter called "four-primary-color signals").

It should be noted here that Patent Documents 1 through 3 listed below describe techniques related to the present invention. Specifically, Patent Document 1 describes a signal processing circuit for self-emission display devices wherein each pixel is composed of four unit pixels of RGBW. Patent Document 2 describes a RGBW liquid crystal display device wherein an output brightness data for the color white is calculated from an input data corresponding to three primary colors of RGB, as well as an arrangement for using the RGBW liquid crystal display device as an RGB liquid crystal display device. Patent Document 3 also describes a RGBW liquid crystal display device wherein an output brightness data for the color white is calculated from an input data corresponding to three primary colors of RGB and the W output brightness data is used to drive a brightness-control sub-pixel.

[Patent Document 1] JP-A 2006-163068 Gazette
[Patent Document 2] JP-A 2002-149116 Gazette
[Patent Document 3] JP-A 2001-154636 Gazette

DISCLOSURE OF THE INVENTION

Problems to be Solved by the Invention

Liquid crystal panels of a four-primary-color configuration as described above have a superior display capability to liquid crystal panels of a three-primary-color configuration. However, in cases where the primary-color signals are digital signals, it is typical that a certain number of bits are pre-assigned to each of the primary colors, and four-primary-color signals obtained from the three-primary-color signals through a conversion process cannot take all possible states of the four-primary-color signals. In other words, liquid crystal panels of a four-primary-color configuration are not able to exhibit their full potential when they are driven by using four-primary-color signals which are obtained through conversion from three-primary-color signals.

Also, even when the externally supplied signals are four-primary-color signals, there are cases depending on external environments, contents of display, etc. where driving the liquid crystal panel of the four-primary-color configuration simply based on the supplied four-primary-color signals does not produce a high quality color image of a level potentially achievable by the liquid crystal panel. For example, when surrounds of the display device is bright, it is preferable to make a display at a higher brightness than the level based on the externally supplied four-primary-color signals in order to achieve a good display. Also, there are cases where it is preferable to make adjustment on a specific color(s) or brightness given by the externally supplied four-primary-color signals in order to improve display quality when specific scenes are displayed on the display device.

It is therefore an object of the present invention to provide a drive control circuit for a color display device which is capable of displaying high-quality color images suited for external environment, display contents or the like by fully utilizing high representational capability of a display panel of multi-primary color configuration such as a liquid crystal panel of a four-primary-color configuration.

Means for Solving the Problems

A first aspect of the present invention provides a drive control circuit for a color display device designed for display of a color image based on a predetermined four or greater number of primary colors including three primary colors of red, green and blue. The drive control circuit drives a display section for the display of the color image. The drive control circuit includes:

a conversion circuit for receiving a control signal externally, and based on the control signal converting first primary-color signals which are digital signals representing the color image based on the predetermined number of primary colors into second primary-color signals which represent the color image based on the predetermined number of primary colors; and a drive circuit for generating a drive signal for driving the display section based on primary-color signals obtained from the conversion circuit, and supplying the drive signal to the display section;

wherein the conversion circuit converts the first primary-color signals into the second primary-color signals by adjusting a level of the first primary-color signals in accordance with the control signal so that a relationship between the first primary-color signals and the second primary-color signals in those colors other than the three primary colors is different from a relationship between the first primary-color signals and the second primary-color signals in any of the three primary colors.

A second aspect of the present invention provides the drive control circuit according to the first aspect of the present invention, wherein the conversion circuit receives the first primary-color signals externally, and supplies the second primary-color signals to the drive circuit.

A third aspect of the present invention provides the drive control circuit according to the first aspect of the present invention, wherein the conversion circuit includes:

a level conversion circuit for receiving the first primary-color signals externally, and converting the first primary-color signals into the second primary-color signals by adjusting a level of the first primary-color signals in accordance with the control signal so that a relationship between the first primary-color signals and the second primary-color signals in those colors other than the three primary colors is different from a relationship between the first primary-color signals and the second primary-color signals in any of the three primary colors;

a primary-color conversion circuit for receiving third primary-color signals as externally supplied digital signals representing the color image based on the three primary colors, and converting the third primary-color signals into fourth primary-color signals which represent the color image based on the predetermined number of primary colors; and a selection circuit for selecting a set of primary-color signals from the second primary-color signals obtained by the level conversion circuit and the fourth primary-color signals obtained by the primary-color conversion circuit, and supplying the selected primary-color signals to the drive circuit.

A fourth aspect of the present invention provides the drive control circuit according to the first aspect of the present invention, wherein the conversion circuit includes:

a primary-color conversion circuit for receiving third primary-color signals as externally supplied digital signals representing the color image based on the three primary colors, and converting the third primary-color signals into fourth primary-color signals which are digital signals representing the color image based on the predetermined number of primary colors;

a selection circuit for receiving primary-color signals as externally supplied digital signals representing the color image based on the predetermined number of primary colors, and outputting either the primary-color signals received externally or the fourth primary-color signals obtained from the primary-color conversion circuit, as the first primary-color signals; and a level conversion circuit for converting the first primary-color signals into the second primary-color signals by adjusting a level of the first primary-color signals in accordance with the control signal so that a relationship between the first primary-color signals and the second primary-color signals in those colors other than the three primary colors is different from a relationship between the first primary-color signals and the second primary-color signals in any of the three primary colors, and supplying the second primary-color signal to the drive circuit.

A fifth aspect of the present invention provides the drive control circuit according to the first aspect of the present invention, wherein the conversion circuit includes:

a primary-color conversion circuit for receiving third primary-color signals as externally supplied digital signals representing the color image based on the three primary colors, and converting the third primary-color signals into fourth primary-color signals which represent the color image based on the predetermined number of primary colors; and a level conversion circuit for receiving the fourth primary-color signals as the first primary-color signals, and converting the first primary-color signals into the second primary-color signals by adjusting a level of the first primary-color signals in accordance with the control signal so that a relationship between the first primary-color signals and the second primary-color signals in those colors other than the three primary colors is different from a relationship between the first primary-color signals and the second primary-color signals in any of the three primary colors, and supplying the second primary-color signal to the drive circuit.

A sixth aspect of the present invention provides a color display device which includes the drive control circuit according to any one of the first through fifth aspects of the present invention.

A seventh aspect of the present invention provides the color display device according to the sixth aspect of the present invention, wherein the display section includes a liquid crystal panel which has a plurality of pixel formation portions for displaying color images;

each pixel formation portion includes a predetermined number of sub-pixel formation portions for controlling amounts of optical transmission of the predetermined number of primary colors respectively; and the drive circuit causes the display section to display a color image based on the predetermined number of primary colors by supplying the drive signal to the liquid crystal panel.

An eighth aspect of the present invention provides the color display device according to the seventh aspect of the present invention, wherein the predetermined number of primary colors are provided by red, green, blue and white; and each pixel formation portion includes an R sub-pixel formation portion for controlling the amount of red light transmission, a G sub-pixel formation portion for controlling the amount of green light transmission, a B sub-pixel formation portion for controlling the amount of blue light transmission and a W white sub-pixel formation portion for controlling the amount of white light transmission.

A ninth aspect of the present invention provides a drive control method for a color display device designed for display of a color image based on a predetermined four or greater number of primary colors including three primary colors of red, green and blue, for driving a display section so as to display the color image. The drive control method includes:

a conversion step of receiving a control signal externally, and based on the control signal converting first primary-color signals which are digital signals representing the color image based on the predetermined number of primary colors into second primary-color signals which represent the color image based on the predetermined number of primary colors; and a driving step of generating a drive signal for driving the display section based on primary-color signals obtained from the conversion step, and supplying the drive signal to the display section;

wherein the conversion step converts the first primary-color signals into the second primary-color signals by adjusting a level of the first primary-color signals in accordance with the control signal so that a relationship between the first primary-color signals and the second primary-color signals in those colors other than the three primary colors is different from a relationship between the first primary-color signals and the second primary-color signals in any of the three primary colors.

Advantages of the Invention

According to the first aspect of the present invention, primary-color signals (the first primary-color signals) which represent a color image based on a predetermined four or greater number of primary colors including the three primary colors of red, green and blue undergo a level adjustment performed in accordance with an external control signal. Then, based on the adjusted primary-color signals (the second primary-color signals) a drive signal is generated for driving the display section. In this process, the conversion from the first primary-color signals into the second primary-color signals through the adjustment process of the first primary-color signal levels is performed in such a way that a relationship between the first primary-color signals and the second primary-color signals in those predetermined primary colors other than the three primary colors is different from a relationship between the first primary-color signals and the second primary-color signals in any of the three primary colors. This makes it possible to adjust primary-color signal levels for display of the color image which is not achievable by using the three primary colors of red, green and blue. In other words, it is now possible to perform a level adjustment which is specifically designed for primary-color signals (multi-primary-color signals) that represent color images based on a predetermined four or greater number of primary colors. Furthermore, such an adjustment can be performed using an external control signal and in real time. Therefore, it is now possible, for example, to vary the value of the control signal in accordance with a level of brightness around the display device and thereby provide consistently good color image display regardless of the brightness in the surrounds. It is also possible to increase display quality by making adjustment to a specific color(s) or brightness according to the nature of the scene to be displayed by the display device, through this external adjustment to the first primary-color signals based on the control signal.

According to the second aspect of the present invention, the first primary-color signals, which are primary-color signals representing a color image based on a predetermined four or greater number of primary colors including the three primary colors of red, green and blue, are provided externally, and then undergo a level adjustment performed in accordance with an external control signal. Then, based on the adjusted primary-color signals (the second primary-color signals) a drive signal is generated for driving the display section. The arrangement offers the same advantages as offered by the first aspect of the present invention, by providing the same level adjustment as in the first aspect of the present invention which is based on an external control signal and is specifically designed for the multi-primary-color signals, to the first primary-color signals which have a superior display capability to color image displaying by means of the three primary colors of red, green and blue.

According to the third aspect of the present invention, the first primary-color signals which represent a color image based on a predetermined four or greater number of primary colors (multi primary colors) including the three primary colors of red, green and blue are supplied externally and are converted into the second primary-color signals by the level conversion circuit as in the second aspect of the present invention. Also, the third primary-color signals which are supplied externally and represent the color image based on the three primary colors of red, green and blue are converted into the fourth primary-color signals which represent the color image based on multi-primary colors. Then, based on either the second or the fourth primary-color signals a drive signal is generated for driving the display section. Therefore, display devices which have a display section of a multi-primary-color configuration can now provide the same advantages as offered by the second aspect of the present invention, i.e., receiving externally supplied primary-color signals (the first primary-color signals) corresponding to multi-primary colors, performing a level adjustment specifically designed for the primary-color signals based on an external control signal, and displaying the color image based on the multi-primary colors, and in addition, the arrangement also provides the conventional display method of receiving primary-color signals of the three primary colors and making display based on these multi-primary colors.

According to the fourth aspect of the present invention, selection is made for a set of multi-primary-color signals from two, i.e., multi-primary-color signals which are externally supplied primary-color signals representing a color image based on a predetermined four or greater number of primary colors (multi-primary colors) including the three primary colors of red, green and blue, and the fourth primary-color signals which are primary-color signals obtained through conversion of the third primary-color signals supplied externally as primary-color signals representing the color image based on the three primary colors of red, green and blue. Then, the selected primary-color signals (the first primary-color signals) undergo a level adjustment process based on an external control signal as in the second aspect of the present invention, and a drive signal for driving the display section is generated based on the adjusted primary-color signals (the second primary-color signals). Thus, the arrangement allows reception of whichever set of the multi-primary-color signals that represent a color image based on multi-primary colors and the three-primary-color signals that represent a color image based on the three primary colors, from outside. According to the arrangement, it is possible to offer the same advantages as offered by the second aspect of the present invention, of performing a level adjustment specifically designed for the primary-color signals based on an external control signal and displaying the color image based on the multi-primary colors using the primary-color signals of whichever configuration.

According to the fifth aspect of the present invention, the third primary-color signals which are supplied externally and represent a color image based on the primary colors of red, green and blue are converted into the fourth primary-color signals which represent a color image based on a predetermined four or greater number of primary colors (multi primary colors) including the three primary colors of red, green and blue. Then, the fourth primary-color signals undergo, as the first primary-color signals, a level adjustment based on an external control signal as in the second aspect of the present invention, and based on the adjusted primary-color signals (the second primary-color signals), a drive signal is generated for driving the display section. Thus, it is possible to receive primary-color signals which represent a color image based on the three primary colors from outside, and provide the same advantages as offered by the second aspect of the present invention, of performing a level adjustment specifically designed for the primary-color signals based on an external control signal and displaying the color image based on the multi-primary colors.

According to the sixth aspect of the present invention, it is possible to provide a display device which is capable of offering the same advantages as offered by the first through the fifth aspects of the present invention.

According to the seventh aspect of the present invention, it is possible to provide a liquid crystal display device which is capable of offering the same advantages as offered by the first through the fifth aspects of the present invention.

According to the eighth aspect of the present invention, each pixel formation portion includes a W sub-pixel formation portion which controls the amount of transmission of white light, and therefore, it is possible to adjust the brightness or the white-color component in a displayed image using an external control signal while reducing increase in power consumption.

BRIEF DESCRIPTION OF THE DRAWINGS

FIG. 6 is a block diagram which shows a configuration example of a primary-color calculator in the conversion circuit.

FIG. 7 is a diagram for describing a look-up table (LUT) in the conversion circuit.

FIG. 8 is a block diagram which shows another configuration example of the primary-color calculator in the conversion circuit.

DESCRIPTION OF THE REFERENCE SYMBOLS

| | |
|---|---|
| 10 | Sub-pixel formation portion |
| 12 | TFT (Thin Film Transistor) |
| 14 | Pixel electrode |
| 20 | Pixel formation portion |
| 80 | Primary-color conversion circuit |
| 82 | Data selector (Selection circuit) |
| 100 | Conversion circuit |
| 102 | Level conversion circuit |
| 120X | Primary-color calculator (X = R, G, B, W) |
| 200 | Display control circuit |
| 300 | Drive control circuit |
| 310 | Data signal line drive circuit (Drive circuit) |
| 320 | Scanning signal line drive circuit |
| 500 | Display section |
| 501 | Color filter |
| 502 | Liquid crystal panel main body |
| 503 | Backlight |
| Ls | Data signal line |
| Lg | Scanning signal line |
| Lcs | Auxiliary capacity line |
| Ccs | Auxiliary capacity |
| Ecom | Common electrode |
| Vcs | Auxiliary electrode voltage |
| Vcom | Common voltage |
| Vg | Scanning signal voltage |
| Vs | Data signal voltage (Drive signal) |
| Ri, Gi, Bi, Wi | Input primary-color signals |
| Ro, Go, Bo, Wo | Output primary-color signals |
| Ctl | Primary-color control signal |
| Sel | Selection control signal |

BEST MODE FOR CARRYING OUT THE INVENTION

Hereinafter, embodiments of the present invention will be described with reference to the attached drawings.

1. Overall Configuration

Figure 1:
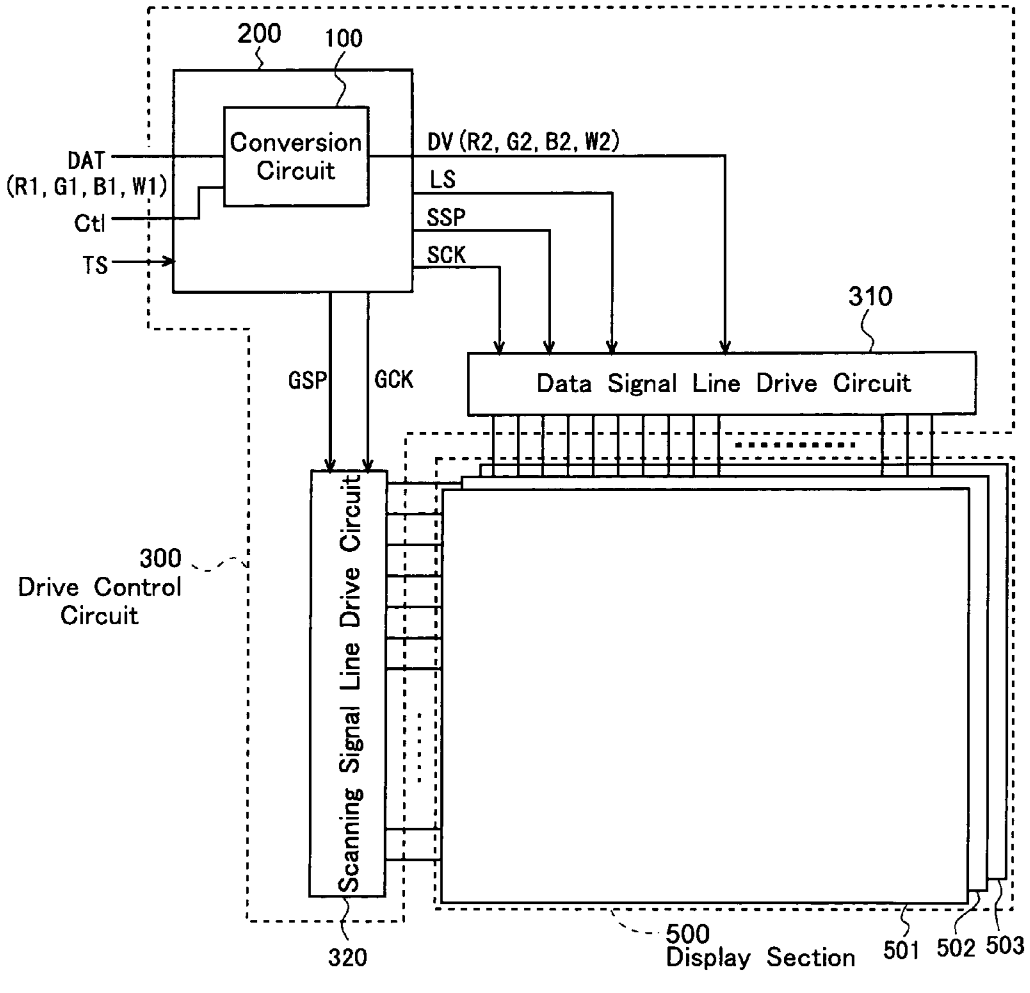
FIG. 1 is a block diagram which shows an overall configuration of a liquid-crystal color-display device provided with a drive control circuit according to an embodiment of the present invention.

FIG. 1 is a block diagram which shows an overall configuration of a liquid-crystal color-display device provided with a drive control circuit according to an embodiment of the present invention. This liquid crystal display device includes a display section 500 which has an active matrix liquid-crystal color display panel, and a drive control circuit 300 which generates drive signals for driving the display section 500.

The display section 500 includes a color filter 501, a liquid crystal panel main body 502 and a backlight 503. The liquid crystal panel main body 502 is formed with a plurality of data signal lines Ls and a plurality of scanning signal lines Lg crossing these data signal lines Ls. The liquid crystal panel main body 502 and the color filter 501 provide a color liquid crystal panel which includes a plurality of pixel formation portions arranged in a matrix pattern. As will be described later, each pixel formation portion is constituted by the same number of sub-pixel formation portions as the number of primary colors employed in displaying color images. Each sub-pixel formation portion corresponds to one of the intersections made by the data signal lines Ls and the scanning signal lines. Also, an auxiliary capacity line Lcs is provided in parallel with each scanning signal line, and a common electrode Ecom is provided for all of the sub-pixel formation portions. In the present embodiment, color image display is based on four primary colors of red, green, blue and white, but the present invention is not limited by this as will be clarified later.

The backlight 503, which is a surface illuminator provided by a cold cathode fluorescent lamp for example, is driven by an unillustrated drive circuit and throws a white light to a back surface of the liquid crystal panel main body 502.

Figure 2:
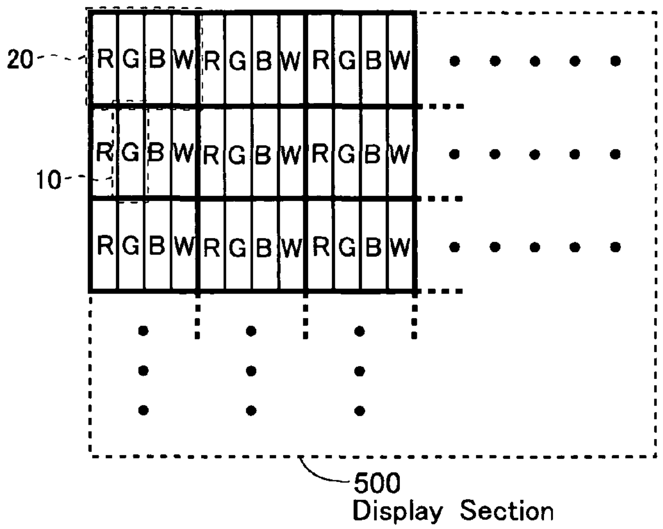
FIG. 2 is a conceptual diagram which shows a configuration of a display section in the embodiment.

FIG. 2 is a conceptual diagram which shows a configuration of the display section 500. As shown in FIG. 2, each pixel formation portion 20 in the display section 500 is made of an R sub-pixel formation portion, a G sub-pixel formation portion, a B sub-pixel formation portion and a W sub-pixel formation portion which correspond to red, green, blue and white respectively (Note that every sub-pixel formation portion will be indicated by a reference symbol "10"). In a color image displayed by the display section 500, each pixel is made of an R sub-pixel, a G sub-pixel, a B sub-pixel and W sub-pixel which correspond to red, green, blue and white respectively.

Figure 3:
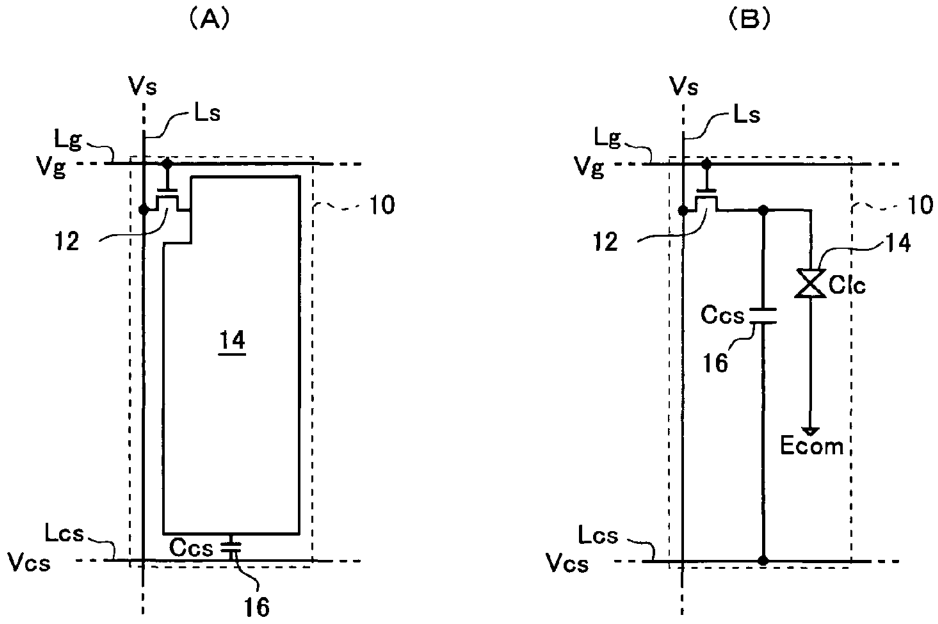
FIG. 3 consists of a conceptual diagram (A) and an equivalent circuit diagram (B) which show a pixel formation portion of the display section in the embodiment.

Each sub-pixel formation portion 10 has a configuration as shown in FIG. 3(A) and FIG. 3(B). FIG. 3(A) is a conceptual diagram which shows an electric configuration of one sub-pixel formation portion 10 in the display section 500 whereas FIG. 3(B) is an equivalent circuit diagram which shows an electric configuration of the sub-pixel formation portion 10. As shown in these FIGS. 3 (A) and (B), each sub-pixel formation portion 10 includes a switching element provided by a thin film transistor (Thin Film Transistor: Hereinafter abbreviated as "TFT") 12 having its gate terminal connected to the scanning signal line Lg which passes an intersection corresponding to the sub-pixel formation portion, and its source terminal connected to the data signal line Ls which passes this intersection; a pixel electrode 14 connected to the drain terminal of the TFT 12; and an auxiliary electrode 16 provided for formation of an auxiliary capacity Ccs between itself and the pixel electrode 14. Also, each sub-pixel formation portion 10 includes a common electrode Ecom which serves all of the sub-pixel formation portions 10; and a liquid crystal layer which is provided commonly to all of the sub-pixel formation portion 10, sandwiched between the pixel electrode 14 and the common electrode Ecom, and serves as an electro-optical element. The pixel electrode 14, the common electrode Ecom and the liquid crystal layer between them form a liquid crystal capacity Clc. Hereinafter, a sum of the liquid crystal capacity Clc and the auxiliary capacity Ccs will be called "pixel capacity" and will be indicated with a reference symbol "Cp".

The drive control circuit 300 has a display control circuit 200, a data signal line drive circuit 310 and a scanning signal line drive circuit 320. The display control circuit 200 receives a data signal DAT, a timing control signal TS and a primary-color control signal Ctl from outside of the liquid crystal display device, and outputs a digital image signal DV, a data start pulse signal SSP, a data clock signal SCK, a latch strobe signal LS, a gate start pulse signal GSP, a gate clock signal GCK, etc.

As shown in FIG. 2, in the present embodiment, each pixel formation portion 20 in the display section 500 is constituted by an R sub-pixel formation portion, a G sub-pixel formation portion, a B sub-pixel formation portion and W sub-pixel formation portion which correspond to red, green, blue and white respectively, whereas the data signal DAT which is supplied externally to the display control circuit 200 is composed of four primary-color signals R1, G1, B1, W1 which correspond to the four primary colors of red, green, blue and white. The display control circuit 200 includes a conversion circuit 100 for level adjustment of these primary-color signals (hereinafter called "first primary-color signals") R1, G1, B1, W1. After the level adjustment, the conversion circuit 100 outputs the adjusted primary-color signals as second primary-color signals R2, G2, B2, W2. The level adjustment in this process is controlled by using the primary-color control signal Ctl. (Details will be described later.) The digital image signal DV is composed of these second primary-color signals R2, G2, B2, W2, and represents a color image which is to be displayed in the display section 500. The data start pulse signal SSP, the data clock signal SCK, the latch strobe signal LS, the gate start pulse signal GSP, and the gate clock signal GCK, etc. are timing signals for controlling display timing when the images is displayed in the display section 500.

The data signal line drive circuit 310 receives the digital image signal DV (R2, G2, B2, W2), the data start pulse signal SSP, the data clock signal SCK, and the latch strobe signal LS which are outputted from the display control circuit 200, and applies a data signal voltage Vs as the drive signal to each data signal line Ls in order to charge the pixel capacity Cp (=Clc+Ccs) in each sub-pixel formation portions 10 in the display section 500. During this process, in the data signal line drive circuit 310, the digital image signal DV which indicates a voltage to be applied to each data signal line Ls is held sequentially at each pulse generation of the clock signal SCK. Then, at each pulse generation of the latch strobe signal LS, the digital image signal DV on the hold is converted into analog voltages, and are applied as the data signal voltages Vs to all of the data signal lines Ls in the display section 500 at one time. Specifically, the data signal line drive circuit 310 generates the data signal voltages Vs in the form of analog voltages which represent the primary-color signals R2, G2, B2, W2 contained in the digital image signal DV, and then applies the data signal voltages Vs which represent the red primary-color signal R2 to the data signal lines Ls connected with the R sub-pixel formation portions 10, the data signal voltages Vs which represent the green primary-color signal G2 to the data signal lines Ls connected with the G sub-pixel formation portions 10, the data signal voltages Vs which represent the blue primary-color signal B2 to the data signal lines Ls connected with the B sub-pixel formation portions 10, and the data signal voltages Vs which represent the white primary-color signal W2 to the data signal lines Ls connected with the W sub-pixel formation portions 10.

The scanning signal line drive circuit 320 makes sequential application of an active scanning signal (a scanning signal voltage Vg which turns on the TFT 12) to the scanning signal lines Lg in the display section 500 based on the gate start pulse signal GSP and the gate clock signal GCK.

The drive control circuit 300 also includes an unillustrated auxiliary electrode drive circuit and a common electrode drive circuit. The auxiliary electrode drive circuit applies a predetermined auxiliary electrode voltage Vcs to each auxiliary capacity line Lcs whereas the common electrode drive circuit applies a predetermined common voltage Vcom to the common electrode Ecom. It should be noted here that the auxiliary electrode voltage Vcs and the common voltage Vcom may be the same voltage under an arrangement that the auxiliary electrode drive circuit and the common electrode drive circuit are provided by a common circuit.

With the arrangement described above, the data signal line Ls is supplied with the data signal voltage Vs, the scanning signal line Lg is supplied with the scanning signal, the common electrode Ecom is supplied with the common voltage Vcom, and the auxiliary capacity line Lcs is supplied with the auxiliary electrode voltage Vcs in the display section 500. Thus, a voltage in accordance with the digital image signal DV is held at the pixel capacity Cp in each sub-pixel formation portion 10 and is applied to the liquid crystal layer. As a result, a color image represented by the digital image signal DV is displayed in the display section 500. It should be noted here that in this process, each R sub-pixel formation portion 10 controls the amount of transmission of red light in accordance with the voltage held in the pixel capacity Cp in the portion; each G sub-pixel formation portion 10 controls the amount of transmission of green light in accordance with the voltage held in the pixel capacity Cp in the portion, each B sub-pixel formation portion 10 controls the amount of transmission of blue light in accordance with the voltage held in the pixel capacity Cp in the portion; and each W sub-pixel formation portion 10 controls the amount of transmission of white light in accordance with the voltage held in the pixel capacity Cp in the portion.

2. Conversion Circuit

Figure 4:
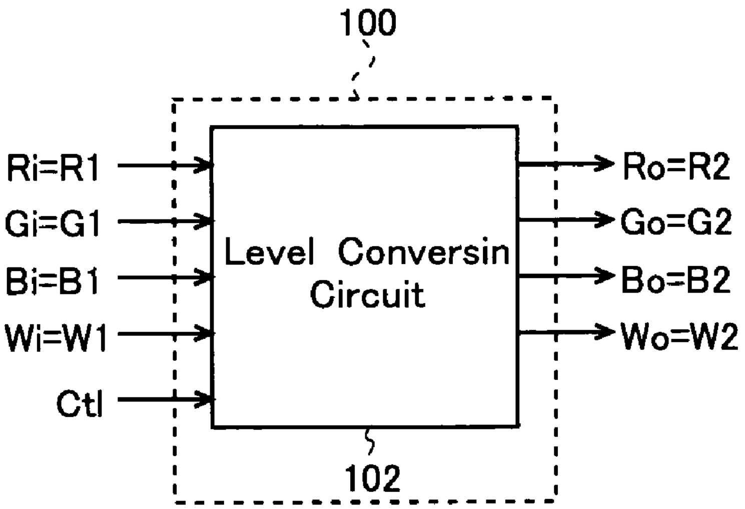
FIG. 4 shows a conversion circuit and a signal input-output relationship to/from the conversion circuit in the embodiment.

Next, description will be made for the conversion circuit 100 in the drive control circuit 300 according to the present embodiment described above. As shown in FIG. 4, the conversion circuit 100 is implemented as a level conversion circuit 102 which is capable of adjusting the level of each of the first primary-color signals R1, G1, B1, W1 contained in the external data signal DAT based on the primary-color control signal Ctl. Hereinafter, these first primary-color signals R1, G1, B1, W1 inputted to the level conversion circuit 102 will be called input primary-color signals Ri, Gi, Bi, Wi, and the second primary-color signals R2, G2, B2, W2 outputted from the level conversion circuit 102 will be called output primary-color signals Ro, Go, Bo, Wo in describing a function of the level conversion circuit 102.

2.1 Example 1

The conversion circuit 100 in the present embodiment may be provided by a level conversion circuit 102 which outputs the output primary-color signals Ro, Go, Bo, Wo that have the following relationship with the input primary-color signals Ri, Gi, Bi, Wi (hereinafter, the level conversion circuit 102 as such will be called "Example 1"):

$$Ro=Ri \quad (1a)$$

$$Go=Gi \quad (1b)$$

$$Bo=Bi \quad (1c)$$

$$Wo=f(Ctl,Wi) \quad (1d)$$

In the above, "f(x, y)" is a function of independent variables x and y (The same applies hereinafter). Therefore, the above mathematical expression (1d) indicates that values of the output primary-color signal Wo of the color white is a function of a value of the primary-color control signal Ctl and a value of the input primary-color signal Wi of the color white.

For example, take a case where the primary-color control signal Ctl is provided by an eight-bit digital signal, and by varying its value within a range of 0 through 255 (0x00h through 0xFFh), the value of the output primary-color signal Wo of the color white is controlled to vary linearly within a range of 0 through 100% of the value of the input primary-color signal Wi of the color white. In this case, the above mathematical expressions (1a) through (1d) will be as follows:

$$Ro=Ri \quad (1\text{-}2a)$$

$$Go=Gi \quad (1\text{-}2b)$$

$$Bo=Bi \quad (1\text{-}2c)$$

$$Wo=(Ctl/255)*Wi \quad (1\text{-}2d)$$

In the above, a symbol "/" in the expression (1-2d) means division whereas a symbol "*" means multiplication (The same applies hereinafter).

By employing the level conversion circuit 102 according to the Example 1 as the conversion circuit 100 in the present embodiment, it becomes possible to perform intensity adjustment on the white-color component in color images displayed in the display section 500, based on the primary-color control signal Ctl without modifying the data signal DAT which is supplied externally to the liquid crystal display device.

It should be noted here that in the Example 1 given above, intensity adjustment is performed only to the white-color component. However, intensity adjustment may be made to the red-color component, the green-color component or the blue-color component based on the primary-color control signal Ctl rather than to the white-color component. Also, the function f in the above-given expression (1d) is not limited to the one given in the right-hand side of the expression (1-2d) but rather, various kinds of functions may be used as the function f.

2.2 Example 2

The conversion circuit 100 in the present embodiment may also be provided by a level conversion circuit 102 which outputs the output primary-color signals Ro, Go, Bo, Wo that have the following relationship with the input primary-color signals Ri, Gi, Bi, Wi (hereinafter, the level conversion circuit 102 as such will be called "Example 2"):

$$Ro=fr(Ctl,Ri) \quad (2a)$$

$$Go=fg(Ctl,Gi) \quad (2b)$$

$$Bo=fb(Ctl,Bi) \quad (2c)$$

$$Wo=fw(Ctl,Wi) \quad (2d)$$

In the above, each of "fr(x, y)", "fg(x, y)", "fb(x, y)", and "fw(x, y)" is a function of independent variables x and y. Of these functions, the function fw is different from any of the functions fr, fg or fb. The functions fr, fg and fb may be the same functions with each other or they may be different functions from each other. According to the level conversion circuit 102 offered by the Example 2, it is possible to perform color component intensity adjustment on color images displayed in the display section 500 individually for each of the red, green, blue and white colors by varying the value of primary-color control signal Ctl.

For example, take a case where the primary-color control signal Ctl is provided by an eight-bit digital signal, and by varying its value within a range of 0 through 255 (0x00h through 0xFFh), the value of the output primary-color signal Ro of the color red is varied linearly within a range of 50 through 100% of the value of the input primary-color signal Ri of the color red; the value of the output primary-color signal Go of the color green is varied linearly within a range of 50 through 100% of the value of the input primary-color signal Gi of the color green; the value of the output primary-color signal Bo of the color blue is varied linearly within a range of 50 through 100% of the value of the input primary-color signal Bi of the color blue; and the value of the output primary-color signal Wo of the color white is varied linearly within a range of 0 through 100% of values of the input primary-color signal Wi of the color white. In this case, the above mathematical expressions (2a) through (2d) will be as follows:

$$Ro=\{(Ctl/255)+1\}/2*Ri \quad (2\text{-}2a)$$

$$Go=\{(Ctl/255)+1\}/2*Gi \quad (2\text{-}2b)$$

$$Bo=\{(Ctl/255)+1\}/2*Bi \quad (2\text{-}2c)$$

$$Wo=(Ctl/255)*Wi \quad (2\text{-}2d)$$

By employing the level conversion circuit 102 according to the Example 2 as the conversion circuit 100 in the present embodiment, it becomes possible to perform intensity adjustment on each of the color components in color images displayed in the display section 500 based on the primary-color control signal Ctl without modifying the data signal DAT which is supplied externally to the liquid crystal display device. Also, according to the Example 2, a plurality of level conversion functions are employed, of which the function fw for the color white is different from the other functions fr, fg, fb for the other primary colors (red, green and blue). This makes it possible to perform level adjustment on the primary-color signals thereby displaying color images which are not possible by using only the three primary colors of red, green and blue. In other words, it is now possible to perform a level adjustment specifically designed for primary-color signals which represent color images based on four primary colors of red, green, blue and white.

2.3 Conversion Circuit Configuration

Figure 5:
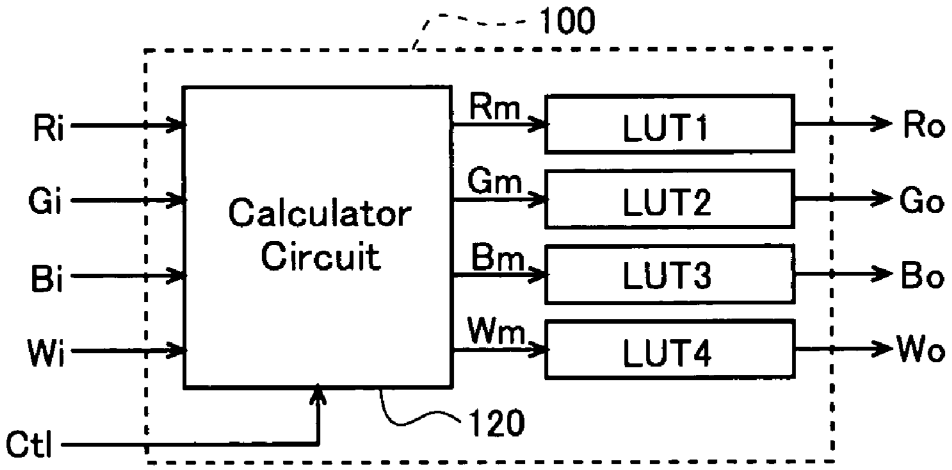
FIG. 5 is a block diagram which shows a configuration of the conversion circuit in the embodiment.

FIG. 5 is a block diagram which shows a configuration example of the conversion circuit 102 such as Example 1 and Example 2 which can be used as the conversion circuit 100 in the present embodiment. In this configuration example, the level conversion circuit 102 has a calculator circuit 120 and four look-up tables LUT1 through LUT4.

The calculator circuit 120 receives the input primary-color signals Ri, Gi, Bi, Wi, and the primary-color control signal Ctl supplied to the level conversion circuit 102, performs predetermined arithmetic operations to each input primary-color signal Xi based on the primary-color control signal Ctl to generate internal primary-color signals Xm (X=R, G, B, W). The calculator circuit 120 has a primary-color calculator 120X for each primary color X. The primary-color calculator 120X may have a configuration as shown in FIG. 6 for example, to perform arithmetic operations given by the expression (1-2d) or (2-2d).

The primary-color calculator 120X shown in FIG. 6 has a multiplier 122, a shift register 124 and a constant generator 126. The multiplier 122 receives an input primary-color signal Xi of a primary color X for which the primary-color calculator 120X works and a primary-color control signal Ctl, then multiplies the value of the input primary-color signal Xi by the value of the primary-color control signal Ctl, and then outputs a multiplication signal Xi*Ctl which indicates a result of the multiplication. The constant generator 126 outputs a signal which represents a predetermined positive integer k (hereinafter called "constant-k signal"). The shift register 124 receives the multiplication signal Xi*Ctl from the multiplier 122 and the constant-k signal from the constant generator 126, shifts the value of multiplication signal Xi*Ctl by k bits to the right, thereby dividing the value of multiplication signal Xi*Ctl by $2^k$, and then outputs a result of the division, as an internal primary-color signal Xm (truncating the numbers after the decimal point). In other words, by using these signal symbols "Xi", "Ctl", "Xm" as representations of values (signal levels) of the respective signals, the following expression is true:

$$Xm=(Xi*Ctl)/2^k \quad (3)$$

It should be noted here that since the value of k is fixed, the rightward shifting by k bits may be implemented by means of wiring rather than by the shift register 124.

The internal primary-color signals Xm (X=R, G, B, W) outputted by the primary-color calculators 120X described above are then inputted to the look-up tables LUTr (r=1, 2, 3, 4) respectively. Each look-up table LUTr converts the inputted value of the internal primary-color signal Xm into a corresponding value found in the look-up table LUTr, and outputs the value given by the conversion as an output primary-color signal Xo. For example, as shown in FIG. 7, the look-up table LUTr converts values of the internal primary-color signal Xm into corresponding values of the output primary-color signal Xo. It should be noted here that the look-up table LUTr need not be provided if the output primary-color signals Xo are obtained by linear conversion performed to the input primary-color signals Xi.

Through the arrangements as shown in FIG. 5 and FIG. 6, the conversions expressed by the mathematical expressions (1-2d) and (2-2d) described earlier are virtually implemented (X=W).

The conversions given by the mathematical expressions (2-2a) through (2-2c) can be implemented also by a configuration given in FIG. 8 (X=R, G, B). In this arrangement, a primary-color calculator 120X includes a multiplier 122, a shift register 124 and a constant generator 126 as in the previous arrangement, and in addition includes an adder 128 and a one-bit right-shift circuit 129. In this arrangement, two values $(Xi*Ctl)/2^k$ and Xi are obtained just as in the arrangement shown in FIG. 6, and these two values are added together by the adder 128. A resulting signal which represents a result of the addition is shifted by the one-bit right-shift circuit 129, thereby divided by two, and the resulting signal which represents a result of the division is outputted as the internal primary-color signal Xm. In other words, the following conversion is performed (X=R, G, B).

$$Xm=(Ctl/2^k+1)*Xi/2 \quad (4)$$

The look-up table LUTr (r=1, 2, 3) performs a predetermined conversion to the values given by the internal primary-color signals Xm, and outputs the output primary-color signals Xo which represents values given by the conversion. Note that the look-up table LUTr need not be provided if the output primary-color signals Xo are obtained by linear conversion performed to the input primary-color signals Xi.

3. Advantages

Figure 9:
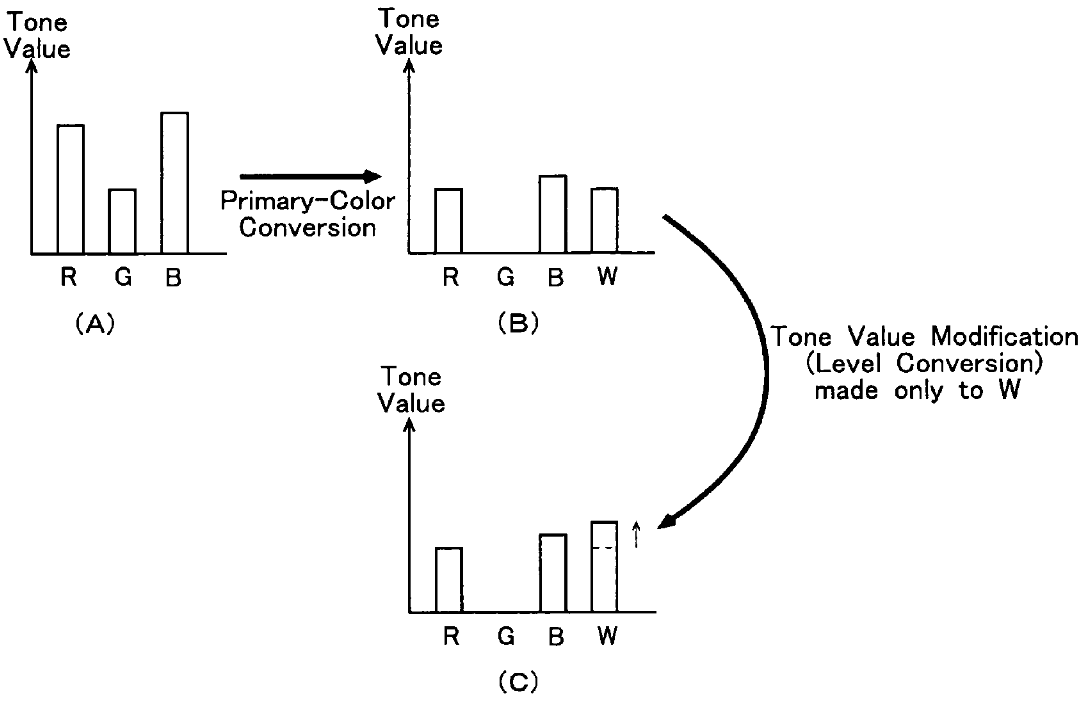
FIG. 9 consists of graphs (A, B and C) for describing a primary-color conversion from primary-color signals corresponding to three primary colors, to primary-color signals corresponding to four primary colors.

According to the present embodiment as described, four primary colors of red, green, blue and white are represented by four primary-color signals respectively, and of these signals, the primary-color signal Wi for the color of white is subjected to a signal level conversion using a function which is different from any of the functions used to the other primary-color signals Ri, Gi, Bi. This makes it possible to perform level adjustment on the primary-color signals thereby displaying color images which are not possible by using only the three primary colors of red, green and blue. In other words, it is now possible to perform a level adjustment specifically designed for four primary colors (or in more general terms, for multi-primary colors) which includes the three primary colors of red, green and blue, and one or more primary colors. Hereinafter, description will be made on this point, with reference to FIG. 9 and FIG. 10.

Figure 10:
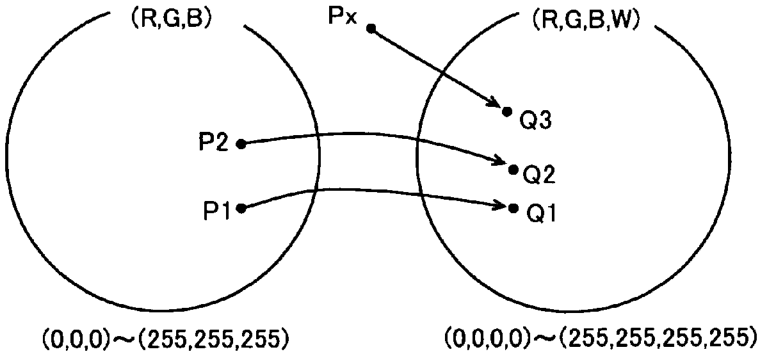
FIG. 10 is a diagram for describing a relationship between values assumable by the primary-color signals corresponding to three primary colors and values assumable by the primary-color signals corresponding to four primary colors.

FIG. 9(A) illustrates a case of displaying a color image in the three primary colors of red, green and blue using three primary-color signals R, G, B. It is possible to convert these three primary-color signals into four primary-color signals R, G, B, W as shown in FIG. 9(B), which are a set of signals for displaying color images by four primary colors of red, green, blue and white (hereinafter, this conversion will be called "primary-color conversion"). However, the primary-color conversion cannot produce a set of four primary-color signals R, G, B, W as shown in FIG. 9(C) which differs from the set of four primary-color signals R, G, B, W shown in FIG. 9(B) in that the primary-color signal W for the color white alone is given an increased value (tone). According to the set of four primary-color signals R, G, B, W as shown in FIG. 9(C), it is possible to display color images which are not possible with the three primary colors of red, green and blue. Generally, a range of colors covered by four primary-color signals R, G, B, W for the colors of red, green, blue and white where each of the primary color signals is assigned with eight bits is wider than a range of colors covered by three primary-color signals R, G, B for the colors of red, green and blue where each of the primary color signals is assigned with eight bits. Therefore, if each of the three-primary-color signals and four-primary-color signals takes such a form of digital signal as described, there is a situation as shown in FIG. 10, where the four primary-color signals R, G, B, W can make all of the colors (Q1, Q2, Q3, etc.) but certain colors (Q3) are not possible by the three primary-color signals R, G, B. However, according to the embodiments described above, it becomes possible to display these color images which are not possible with the three primary-color signals R, G, B of the colors red, green and blue even under a situation where the input primary-color signals Ri, Gi, Bi, Wi are obtained from the primary-color conversion from the three-primary-color signals, since the embodiment makes the display based on the output primary-color signals Ro, Go, Bo, Wo which are obtained from a signal level adjustment performed by the conversion circuit 100.

Also, the embodiments described above allows controlling the primary-color signals R2, G2, B2, W2 (output primary-color signals Ro, Go, Bo, Wo) which are to be supplied to the data signal line drive circuit 310, based on the primary-color control signal Ctl which is supplied from outside the liquid crystal display device. This makes it possible to provide real-time level adjustment of the primary-color signals R2, G2, B2, W2. Therefore, it is now possible to perform primary-color signal adjustment (level conversion) as described above in response to ongoing changes in the external environment or changes in display contents. This means, for example, that the primary-color control signal Ctl may take different values in response to brightness changes around the liquid crystal display device, so that the image is displayed at an increased brightness when the surrounds becomes brighter. Such an arrangement provides consistently good color image display regardless of the brightness in the surrounds. It is also possible to increase display quality by making adjustment to a specific color(s) or brightness according to the nature of the scene to be displayed by the display device, through external adjustment based on the primary-color control signal Ctl performed to the four-primary-color signals supplied from outside. According to the present embodiment, each pixel formation portion 20 includes a W sub-pixel formation portion 10 (FIG. 2) which controls the amount of transmission of white light. Therefore, the adjustment to the brightness or to the white-color component in the displayed image using the externally supplied primary-color control signal Ctl can be accomplished while increase in power consumption is well under control.

4. Variations

Figure 11:
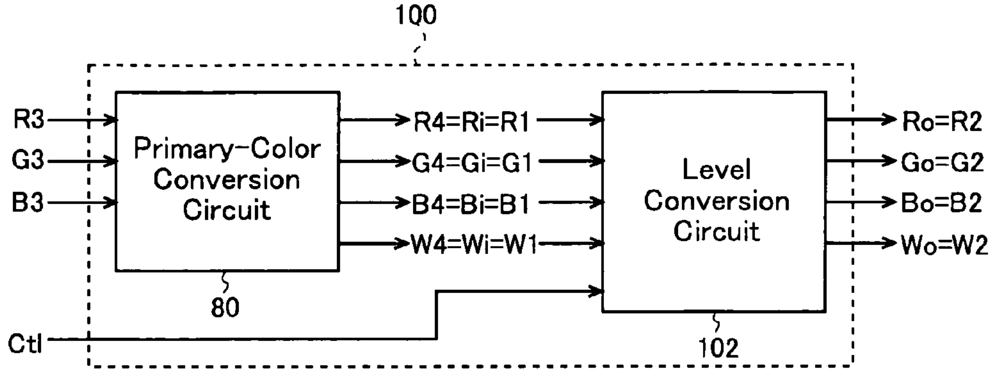
FIG. 11 is a block diagram which shows a conversion circuit configuration in a first variation of the embodiment.

In the embodiment described above, the liquid crystal display device is supplied with four primary-color signals R1, G1, B1, W1 from outside. Now, the conversion circuit 100 shown in FIG. 4 may be replaced by a conversion circuit 100 shown in FIG. 11 which is constituted by a primary-color conversion circuit 80 and a level conversion circuit 102, so that the liquid crystal display device is supplied with three primary-color signals R3, G3, B3 from outside (hereinafter, a drive control circuit 300 in a liquid crystal display device which includes a conversion circuit 100 of the above-described configuration will be called "first variation"). In this case, the three primary-color signals R3, G3, B3 are converted into four primary-color signals R4, G4, B4, W4 by the primary-color conversion circuit 80, and these four primary-color signals R4, G4, B4, W4 are inputted to the level conversion circuit 102 as input primary-color signals Ri, Gi, Bi, Wi. In other words, the level conversion circuit 102 does not receive the input primary-color signals Ri, Gi, Bi, Wi directly from outside the liquid crystal display device, but indirectly via the primary-color conversion circuit 80. In this case, the level conversion circuit 102 receives the four primary-color signals R4, G4, B4, W4 as the first primary-color signals R1, G1, B1, W1 in the previous embodiment and then, just like in the previous embodiment, makes level adjustment to the first primary-color signals R1, G1, B1, W1 in accordance with the primary-color control signal Ctl, thereby converting the first primary-color signals R1, G1, B1, W1 into the second primary-color signals R2, G2, B2, W2. These second primary-color signals R2, G2, B2, W2 are supplied as the digital image signal DV to a data signal line drive circuit 310. Based on the primary-color signals R2, G2, B2, W2, the data signal line drive circuit 310 generates data signals (drive signals) to be applied to the data signal lines Ls for color image display in (see FIG. 1).

Figure 12:
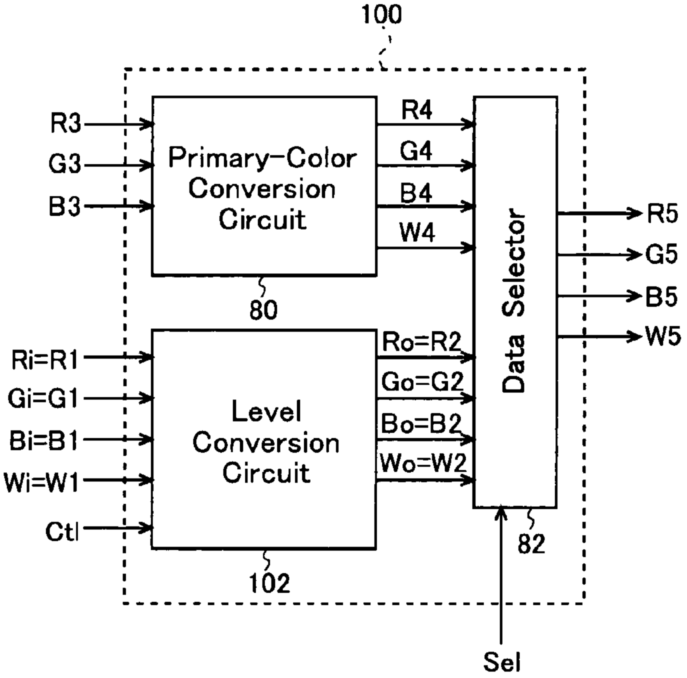
FIG. 12 is a block diagram which shows a conversion circuit configuration in a second variation of the embodiment.

Also, the conversion circuit 100 in the above embodiment may have a configuration shown in FIG. 12, which allows the liquid crystal display device to receive whichever of the four primary-color signals R1, G1, B1, W1 and the three primary-color signals R3, G3, B3 as the external data signal DAT (hereinafter, a drive control circuit 300 in a liquid crystal display device which includes a conversion circuit 100 of the above-described configuration will be called "second variation"). In this arrangement, the conversion circuit 100 has the same primary-color conversion circuit 80 and the level conversion circuit 102 as in the first variation, and in addition, has a data selector 82. The four primary-color signals R4, G4, B4, W4 outputted from the primary-color conversion circuit 80 and the four primary-color signals R2, G2, B2, W2 outputted from the level conversion circuit 102 are inputted to the data selector 82. The data selector 82 receives a selection control signal Sel, and based on the selection control signal Sel, selects the four primary-color signals R4, G4, B4, W4 from the primary-color conversion circuit 80 or the four primary-color signals R2, G2, B2, W2 from the level conversion circuit 102, and then outputs the selected primary-color signals as primary-color signals R5, G5, B5, W5 for input to the data signal line drive circuit 310. These primary-color signals R5, G5, B5, W5 are supplied as the digital image signal DV to the data signal line drive circuit 310. It should be noted here that the selection control signal Sel may be supplied from outside of the liquid crystal display device or there may be a different arrangement where, for example, the selection control signal Sel is generated depending on a result of detection to determine which of the three primary-color signals R3, G3, B3 and the four primary-color signals R1, G1, B1, W1 are being supplied to the liquid crystal display device from outside.

Figure 13:
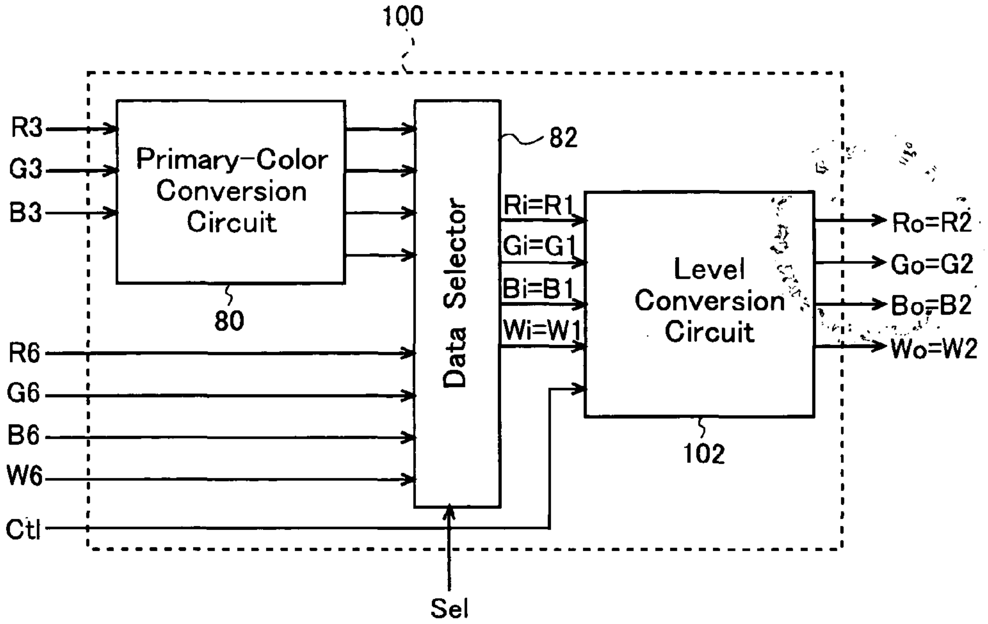
FIG. 13 is a block diagram which shows a conversion circuit configuration in a third variation of the embodiment.

In the second variation, primary-color signals which have undergone a level adjustment performed by the level conversion circuit 102 are inputted to the data selector 82. Instead of this arrangement, the level conversion circuit 102 may be placed after the data selector 82 as shown in FIG. 13 (hereinafter, a drive control circuit 300 in a liquid crystal display device which includes a conversion circuit 100 of the above-described configuration will be called "third variation"). In the conversion circuit 100 of the present configuration, four primary-color signals R6, G6, B6, W6 from outside of the liquid crystal display device are inputted, as they are, to the data selector 82. The data selector 82 selects the four primary-color signals R4, G4, B4, W4 from the primary-color conversion circuit 80 or the four primary-color signals R2, G2, B2, W2 from the outside based on a selection control signal Sel, and the selected primary-color signals are supplied as the first primary-color signals R1, G1, B1, W1 to the level conversion circuit 102. Like in the above-described embodiment, the level conversion circuit 102 performs level adjustment to the first primary-color signals R1, G1, B1, W1 in accordance with the primary-color control signal Ctl, and thereby converts the first primary-color signals R1, G1, B1, W1 into the second primary-color signals R2, G2, B2, W2. These second primary-color signals R2, G2, B2, W2 are supplied as the digital image signal DV to the data signal line drive circuit 310.

Figure 14:
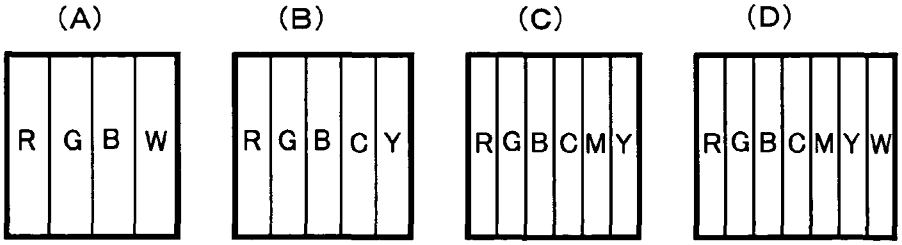
FIG. 14 consists of conceptual diagrams (A through D) illustrating configuration examples of a pixel formation portion for color display based on various multi-primary colors.

In the embodiments described above, display of color images is based on four primary colors consisting of the three primary colors of red, green and blue, plus white. In other words, as shown in FIG. 14(A), each pixel formation portion 20 in the display section 500 which is driven for the display of color images is composed of an R sub-pixel formation portion, a G sub-pixel formation portion, a B sub-pixel formation portion and W sub-pixel formation portion representing the four primary colors of red, green, blue and white respectively (FIG. 2). Correspondingly to this, the data signal DAT which is supplied externally to the display control circuit 200 is composed of four primary-color signals R1, G1, B1, W1 representing the four primary colors respectively (FIG. 1). However, the present invention is not limited to this, but is applicable to any color image display configuration based on other four primary colors or a greater number of multi-primary colors composed of the three primary colors of red, green and blue plus one or more other primary colors. In other words, the present invention is characterized by an arrangement for color image display based on such multi-primary color configurations, providing a capability of making adjustment based on an externally supplied control signal for improved display quality in part of images over display quality based on the three primary colors of red, green and blue. According to such an arrangement, it is possible to offer the same advantages as obtained in the embodiments described above in many other cases where color image display is based on other multi-primary colors than the above-described four primary colors.

For example, five primary colors of red, green, blue, cyan and yellow may be employed in displaying color images. In this case, the display section 500 has pixel formation portions 20 each having, as shown in FIG. 14(B), an R sub-pixel formation portion, a G sub-pixel formation portion, a B sub-pixel formation portion, a C sub-pixel formation portion and a Y sub-pixel formation portion representing the five primary colors of red, green, blue, cyan and yellow, and correspondingly to this, a data signal DAT supplied externally to the display control circuit 200 contains five primary-color signals R1, G1, B1, C1, Y1 representing the five primary colors respectively. The conversion circuit 100, which is supplied with these five primary-color signals R1, G1, B1, C1, Y1 as the input primary-color signals Ri, Gi, Bi, Ci, Yi, makes adjustment on their signal levels based on the primary-color control signal Ctl, and then outputs the adjusted signals as the output primary-color signals Ro, Go, Bo, Co, Yo. In this case, the input primary-color signals Ri, Gi, Bi, Ci, Yi and the output primary-color signals Ro, Go, Bo, Co, Yo are in the following relationships:

$$Ro=fr(Ctl,Ri) \tag{5a}$$

$$Go=fg(Ctl,Gi) \tag{5b}$$

$$Bo=fb(Ctl,Bi) \tag{5c}$$

$$Co=fc(Ctl,Ci) \tag{5d}$$

$$Yo=fy(Ctl,Yi) \tag{5e}$$

In the above, each of "fr(x, y)", "fg(x, y)", "fb(x, y)", "fc(x, y)", and "fy(x, y)" are functions of independent variables x, y. Of these functions, the functions fc and fy are different from any of the functions fr, fg or fb (The functions fr, fg and fb may be the same functions with each other or different functions from each other). In other words, relationships of the input primary-color signals Ci, Yi with the respective output primary-color signals Co, Yo for the primary colors other than red, green and blue, are different from relationships of the input primary-color signals Ri, Gi, Bi with the respective output primary-color signals Ro, Go, Bo for red, green and blue.

As another example, six primary colors of red, green, blue, cyan, magenta and yellow may be employed in displaying color images. In this case, the display section 500 has pixel formation portions 20 each having, as shown in FIG. 14(C), an R sub-pixel formation portion, a G sub-pixel formation portion, a B sub-pixel formation portion, a C sub-pixel formation portion, M sub-pixel formation portion and a Y sub-pixel formation portion representing the six primary colors of red, green, blue, cyan, magenta and yellow, and correspondingly to this, a data signal DAT supplied externally to the display control circuit 200 contains six primary-color signals R1, G1, B1, C1, M1, Y1 representing the six primary colors respectively. The conversion circuit 100, which is supplied with these six primary-color signals R1, G1, B1, C1, M1, Y1 as the input primary-color signals Ri, Gi, Bi, Ci, Mi, Yi, makes adjustment on their signal levels based on the primary-color control signal Ctl, and then outputs the adjusted signals as the output primary-color signals Ro, Go, Bo, Co, Mo, Yo. Relationships of the input primary-color signals Ci, Mi, Yi with the respective output primary-color signals Co, Mo, Yo for the primary colors other than red, green and blue, are different from relationships of the input primary-color signals Ri, Gi, Bi with the respective output primary-color signals Ro, Go, Bo for red, green and blue.

Further, for example, seven primary colors of red, green, blue, cyan, magenta, yellow and white may be employed in displaying color images. In this case, the display section 500 has pixel formation portions 20 each having, as shown in FIG. 14(D), an R sub-pixel formation portion, a G sub-pixel formation portion, a B sub-pixel formation portion, a C sub-pixel formation portion, M sub-pixel formation portion, a Y sub-pixel formation portion and a W sub-pixel formation portion representing the seven primary colors of red, green, blue, cyan, magenta, yellow and white, and correspondingly to this, a data signal DAT supplied externally to the display control circuit 200 contains seven primary-color signals R1, G1, B1, C1, M1, Y1, W1 representing the seven primary colors respectively. The conversion circuit 100, which is supplied with these seven primary-color signals R1, G1, B1, C1, M1, Y1, W1 as the input primary-color signals Ri, Gi, Bi, Ci, Mi, Yi, Wi, makes adjustment on their signal levels based on the primary-color control signal Ctl, and then outputs the adjusted signals as the output primary-color signals Ro, Go, Bo, Co, Mo, Yo, Wo. Relationships of the input primary-color signals Ci, Mi, Yi, Wi with the respective output primary-color signals Co, Mo, Yo, Wi for the primary colors other than the three primary colors of red, green and blue, are different from relationships of the input primary-color signals Ri, Gi, Bi with the respective output primary-color signals Ro, Go, Bo for red, green and blue.

In the embodiments described above, an R sub-pixel formation portion, a G sub-pixel formation portion, a B sub-pixel formation portion and a W sub-pixel formation portion which constitute one pixel formation portion 20 are arranged as shown in FIG. 2 and FIG. 14(A), in a horizontal direction (direction in which the scanning signal line Lg extends). However, the layout pattern of the sub-pixel formation portions within a pixel formation portion (layout pattern in the pixel formation portions) is not limited to this. For example, as shown FIG. 15(A), a 2×2 matrix layout may be used to constitute a pixel formation portion, with two constituent sub-pixel formation portions placed in a horizontal direction and two constituent sub-pixel formation portions placed in a vertical direction (direction in which the data signal line Ls extends).

Figure 15:
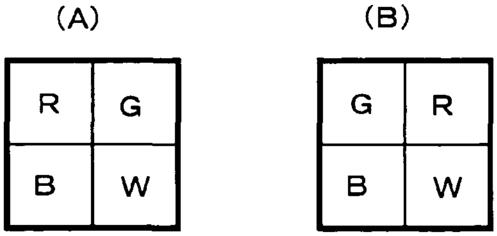
FIG. 15 consists of conceptual diagrams (A and B) which illustrating configuration examples of the pixel formation portion for color display based on four primary colors.

Further, the sequential order of the sub-pixel formation portions (i.e. the sequence in which the primary colors are placed) in one pixel formation portion 20 is not limited, either, to those illustrated in FIG. 14(A) through FIG. 14(D) or in FIG. 15(A). For example, a pixel formation portion shown in FIG. 14(A) is constituted by four sub-pixel formation portions (R sub-pixel formation portion, G sub-pixel formation portion, B sub-pixel formation portion and W sub-pixel formation portion), and they are arranged horizontally in the order of "RGBW". Instead of this, the four sub-pixel formation portions may be arranged horizontally in the order of "BGRW". Still further, in cases where sub-pixel formation portions constituting one pixel formation portion 20 are not arranged in one direction as shown in FIG. 14(A) through FIG. 14(D), but arranged in two directions as shown in FIG. 15(A), there is no limitation to the order in which these sub-pixel formation portions are arranged. For example, when a pixel formation portion 20 is constituted by four sub-pixel formation portions (R sub-pixel formation portion, G sub-pixel formation portion, B sub-pixel formation portion and W sub-pixel formation portion) and they are arranged in the order as shown in FIG. 15(A), the order may be changed as shown in FIG. 15(B). Since the level of brightness in the G pixel formation portion and W pixel formation portion is typically higher on the average than that of the R pixel formation portion and the B pixel formation portion, a better balance will be achieved usually in such an arrangement as shown in FIG. 15(B) where the G pixel formation portion and the W pixel formation portion are not placed right next to each other but are separated from each other.

It should be noted here that thus far, description has been made for a drive control circuit for a liquid crystal display device; however, the present invention is not limited to this. The present invention is applicable to drive control circuits for other types of display devices (for example, to a drive control circuit of an organic EL (Electroluminescenece) display device) where each of their pixels is constituted by four or more sub-pixels representing four or more primary colors respectively.

INDUSTRIAL APPLICABILITY

The present invention is for application to drive control circuits of color display devices designed for displaying color images based on four or more primary colors. For example, the present invention is applicable to a drive control circuit of a liquid crystal display device which has a four-primary-color configuration.

The invention claimed is:

1. A drive control circuit for a color display device designed for display of a color image based on a four or greater number of primary colors including three primary colors of red, green and blue, the drive control circuit driving a display section for the display of the color image, the drive control circuit comprising:

a conversion circuit for receiving a control signal externally, and based on the control signal converting first primary-color signals which are digital signals representing the color image based on the number of primary colors into second primary-color signals which represent the color image based on the number of primary colors; and a drive circuit for generating a drive signal for driving the display section based on primary-color signals obtained from the conversion circuit, and supplying the drive signal to the display section, wherein the conversion circuit converts the first primary-color signals into the second primary-color signals by adjusting a level of the first primary-color signals-as a function of the control signal and the first primary-color signals such that a relationship between the first primary-color signals and the second primary-color signals in those colors other than the three primary colors is different from a relationship between the first primary-color signals and the second primary-color signals in any of the three primary colors, and the conversion circuit includes:

a primary-color conversion circuit for receiving third primary-color signals as externally supplied digital signals representing the color image based on the three primary colors, and converting the third primary-color signals into fourth primary-color signals which are digital signals representing the color image based on the number of primary colors;

a selection circuit for receiving primary-color signals as externally supplied digital signals representing the color image based on the number of primary colors, and outputting either the primary-color signals received externally or the fourth primary-color signals obtained from the primary-color conversion circuit, as the first primary-color signals; and a level conversion circuit for converting the first primary-color signals into the second primary-color signals by adjusting a level of the first primary-color as a function of the control signal and the first primary-color signals such that a relationship between the first primary-color signals and the second primary-color signals in those colors other than the three primary colors is different from a relationship between the first primary-color signals and the second primary-color signals in any of the three primary colors, and supplying the second primary-color signal to the drive circuit.

2. A color display device comprising the drive control circuit according to claim 1.

3. A drive control circuit for a color display device designed for display of a color image based on four or more primary colors including three primary colors of red, green and blue, the drive control circuit driving a display section for the display of the color image, the drive control circuit comprising:

a conversion circuit for receiving a control signal externally, and based on the control signal converting first primary-color signals which are digital signals representing the color image based on the four or more primary colors into second primary-color signals which represent the color image based on the four or more primary colors; and a drive circuit for generating a drive signal for driving the display section based on the second primary-color signals obtained from the conversion circuit, and supplying the drive signal to the display section;

wherein the conversion circuit includes:

a primary-color conversion circuit for receiving third primary-color signals as externally supplied digital signals representing the color image based on the three primary colors, and converting the third primary-color signals into fourth primary-color signals which are digital signals representing the color image based on the four or more primary colors;

a selection circuit for receiving primary-color signals as externally supplied digital signals representing the color image based on the four or more primary colors, and outputting either the primary-color signals received externally or the fourth primary-color signals obtained from the primary-color conversion circuit, as the first primary-color signals; and a level conversion circuit for converting the first primary-color signals into the second primary-color signals by adjusting a level of the first primary-color in accordance with the control signal such that a relationship between the first primary-color signals and the second primary-color signals in those colors other than the three primary colors is different from a relationship between the first primary-color signals and the second primary-color signals in any of the three primary colors, and supplying the second primary-color signals to the drive circuit.

4. A color display device comprising the drive control circuit according to claim 3.

5. A drive control method for a color display device designed for display of a color image based on four or more primary colors including three primary colors of red, green and blue, for driving a display section so as to display the color image, the drive control method comprising:

a conversion step of receiving a control signal externally, and based on the control signal converting first primary-color signals which are digital signals representing the color image based on the four or more primary colors into second primary-color signals which represent the color image based on four or more primary colors;

a driving step of generating a drive signal for driving the display section based on the second primary-color signals obtained from the conversion step, and supplying the drive signal to the display section;

wherein the conversion step includes:

a primary-color conversion step of receiving third primary-color signals as externally supplied digital signals representing the color image based on the three primary colors, and converting the third primary-color signals into fourth primary-color signals which are digital signals representing the color image based on the four or more primary colors;

a selection step of receiving primary-color signals as externally supplied digital signals representing the color image based on the four or more primary colors, and outputting either the primary-color signals received externally or the fourth primary-color signals obtained from the primary-color conversion step, as the first primary-color signals; and a level conversion step of converting the first primary-color signals into the second primary-color signals by adjusting a level of the first primary-color in accordance with the control signal such that a relationship between the first primary-color signals and the second primary-color signals in those colors other than the three primary colors is different from a relationship between the first primary-color signals and the second primary-color signals in any of the three primary colors, and supplying the second primary-color signal to the drive step.

* * * * *